(12) United States Patent
Berg et al.

(10) Patent No.: US 10,137,751 B2
(45) Date of Patent: Nov. 27, 2018

(54) AIR SPRING COMPRISING ADSORPTIVE MATERIAL

(71) Applicant: Vibracoustic GmbH, Darmstadt (DE)

(72) Inventors: Juergen Berg, Barsbuettel (DE); Jakob Gras, Hamburg (DE); Matthias Wolf, Leuneburg (DE); Erhard Moog, Sittensen (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 14/421,850

(22) PCT Filed: Jan. 22, 2014

(86) PCT No.: PCT/EP2014/051256
§ 371 (c)(1),
(2) Date: Feb. 16, 2015

(87) PCT Pub. No.: WO2014/118061
PCT Pub. Date: Aug. 7, 2014

(65) Prior Publication Data
US 2015/0217620 A1     Aug. 6, 2015

(30) Foreign Application Priority Data

Jan. 29, 2013 (EP) ..................................... 13000430
May 29, 2013 (EP) ..................................... 13002799

(51) Int. Cl.
*F16F 9/04*      (2006.01)
*B60G 17/052*    (2006.01)
(Continued)

(52) U.S. Cl.
CPC ..... *B60G 17/0521* (2013.01); *B60G 17/0432* (2013.01); *B60G 17/0485* (2013.01);
(Continued)

(58) Field of Classification Search
CPC ............ B60G 17/0521; B60G 17/0485; B60G 2202/152; F16F 9/0409; F16F 9/05; F16F 9/04; F16F 9/003
See application file for complete search history.

(56) References Cited

U.S. PATENT DOCUMENTS 3,056,473 A * 10/1962 Zeidler ................... F16F 9/003
                                                    188/276
3,231,255 A *  1/1966 Olson ..................... F16F 9/003
                                                    188/268
(Continued)

FOREIGN PATENT DOCUMENTS

DE          2344263 A1    3/1975
WO      WO 9748921 A1 * 12/1997  ................ F16F 9/04
(Continued)

*Primary Examiner* — James A English
(74) *Attorney, Agent, or Firm* — Leydig, Voit & Mayer, Ltd.

(57) ABSTRACT

An air spring system comprising at least one air spring with at least one compressed air chamber with a variable volume. The at least one air spring is connected to a compressor unit as a compressed air supply device with a compressed air storage device. A compressed air space of at least one of the air spring or the compressed air storage device is provided with an adsorptive material.

13 Claims, 7 Drawing Sheets

(51) Int. Cl.
  *B60G 17/04* (2006.01)
  *B60G 17/048* (2006.01)
  *F16F 9/00* (2006.01)
  *F16F 9/05* (2006.01)
(52) U.S. Cl.
  CPC ............... *F16F 9/003* (2013.01); *F16F 9/04* (2013.01); *F16F 9/0409* (2013.01); *F16F 9/05* (2013.01); *B60G 2202/152* (2013.01); *B60G 2202/314* (2013.01); *B60G 2500/22* (2013.01); *B60G 2500/30* (2013.01)

(56) References Cited

U.S. PATENT DOCUMENTS

| | | | | |
|---|---|---|---|---|
| 5,083,756 | A * | 1/1992 | Tobias | F16F 9/003 248/550 |
| 5,467,595 | A * | 11/1995 | Smith | B60G 17/052 280/124.16 |
| 6,052,992 | A * | 4/2000 | Eroshenko | F15B 21/06 60/509 |
| 8,333,367 | B2 * | 12/2012 | Schuckel | F16F 9/04 267/64.28 |
| 8,800,974 | B2 * | 8/2014 | Howard | F16F 9/0409 267/64.19 |
| 8,899,598 | B2 * | 12/2014 | Frank | F16K 31/0651 137/565.18 |
| 8,997,951 | B2 * | 4/2015 | Suciu | F16F 9/003 188/266.1 |
| 9,127,741 | B2 * | 9/2015 | Suciu | F16F 9/003 |
| 9,163,689 | B2 * | 10/2015 | Agarwal | F16F 9/0409 |
| 9,199,524 | B2 * | 12/2015 | Stabenow | B60G 17/0525 |
| 9,267,566 | B2 * | 2/2016 | Nair | F16F 9/0409 |
| 2004/0100005 | A1 | 5/2004 | McLaughlin | |
| 2011/0210486 | A1 * | 9/2011 | Agarwal | B32B 25/04 267/122 |
| 2012/0232210 | A1 * | 9/2012 | Cheng | B60C 1/0008 524/514 |
| 2014/0037119 | A1 * | 2/2014 | Yuasa | H04R 1/02 381/346 |
| 2015/0122145 | A1 * | 5/2015 | Jackson, Jr. | B61F 5/02 105/453 |
| 2015/0219177 | A1 * | 8/2015 | Ura | F16F 9/04 267/64.27 |
| 2016/0153513 | A1 * | 6/2016 | Nieten | B60G 11/27 267/64.27 |
| 2016/0186829 | A1 * | 6/2016 | Coakley | F16F 9/003 152/520 |
| 2017/0182858 | A1 * | 6/2017 | Coakley | B60G 17/048 |

FOREIGN PATENT DOCUMENTS

WO  WO 2012052776 A1  4/2012
WO  WO -2012140895 A1 * 10/2012 ............... H04R 1/02

* cited by examiner

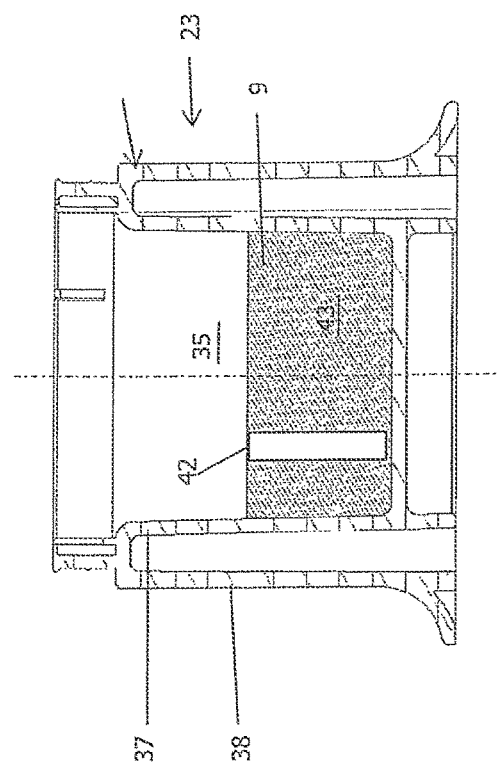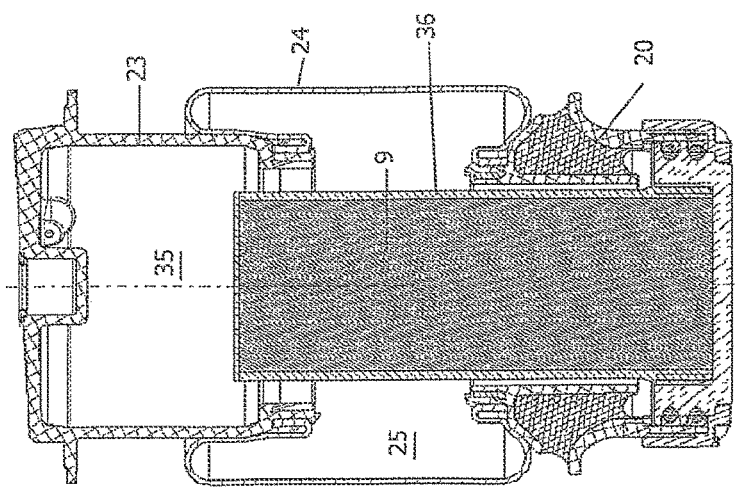

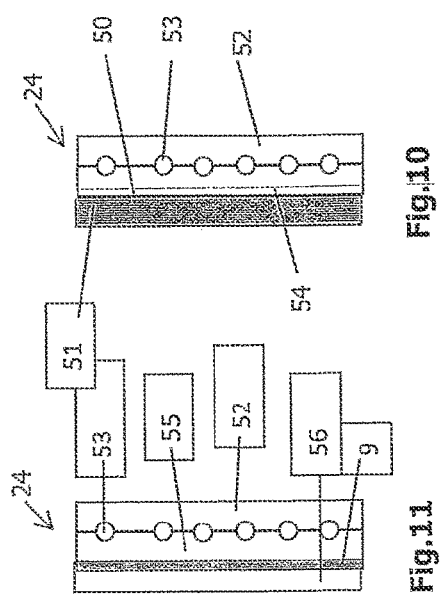
Fig.10
Fig.11
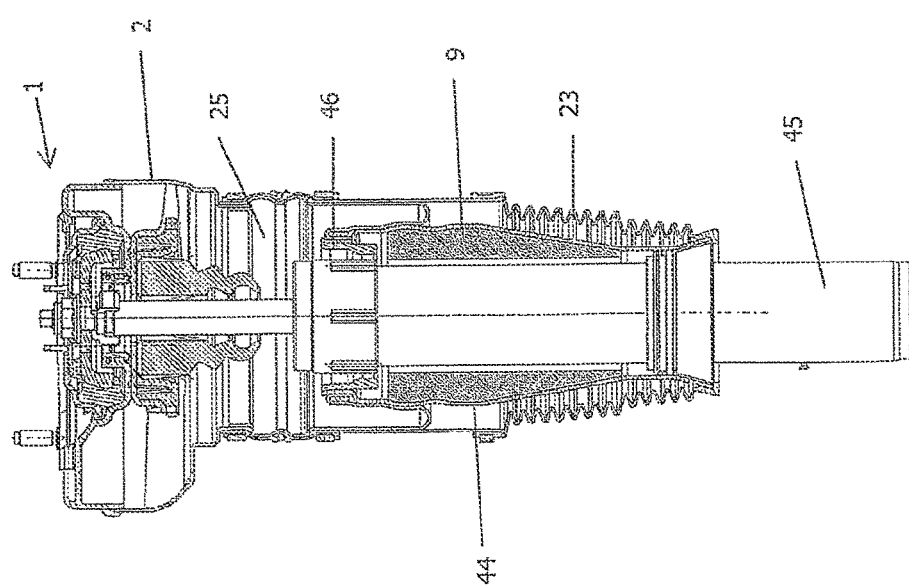
Fig.9

AIR SPRING COMPRISING ADSORPTIVE MATERIAL

CROSS-REFERENCE TO RELATED APPLICATIONS

This application is a U.S. National Phase application under 35 U.S.C. § 371 of International Application No. PCT/EP2014/051256, filed on Jan. 22, 2014, and claims benefit to European Patent Application No. EP 13 000 430.2, filed on Jan. 29, 2013, and European Patent Application No. EP 13 002 799.8, filed on May 29, 2013. The International Application was published in German on Aug. 7, 2014, as WO 2014/118061 A1 under PCT Article 21 (2).

FIELD

The present invention relates to an air spring system having at least one air spring with at least one compressed air chamber with a variable volume, which is connected to a compressor unit as a compressed air supply device with or without a compressed air storage device.

BACKGROUND

One main task of air spring systems is changing the height level of the vehicle. The driving dynamics and driving comfort are also improved with the air spring system. Particularly in the case of passenger vehicles, however, there is the problem of limited accommodation options. Less and less room is available for the components of the air spring system. Therefore, solutions are being sought that require as little construction space as possible.

SUMMARY

In an embodiment, the present invention provides an air spring system comprising at least one air spring with at least one compressed air chamber with a variable volume. The at least one air spring is connected to a compressor unit as a compressed air supply device with a compressed air storage device. A compressed air space of at least one of the air spring or the compressed air storage device is provided with an adsorptive material.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 7 shows a longitudinal section through an air spring with a carbon element in an inner container;

FIG. 8 shows a longitudinal section through a plastic rolling piston with a double wall and an inserted activated carbon element;

FIG. 9 shows a longitudinal section of a air spring damper with an activated carbon element in the rolling piston at the upper part of the spring damper;

FIG. 10 shows a partial section of a rolling bellows with a coating of activated carbon on the inside of the rolling bellows;

FIG. 11 shows a partial view of the rolling bellows with an activated carbon layer in the inner lining of the rolling bellows with a permeable layer on the inside of the inner lining;

DETAILED DESCRIPTION

Figure 1:
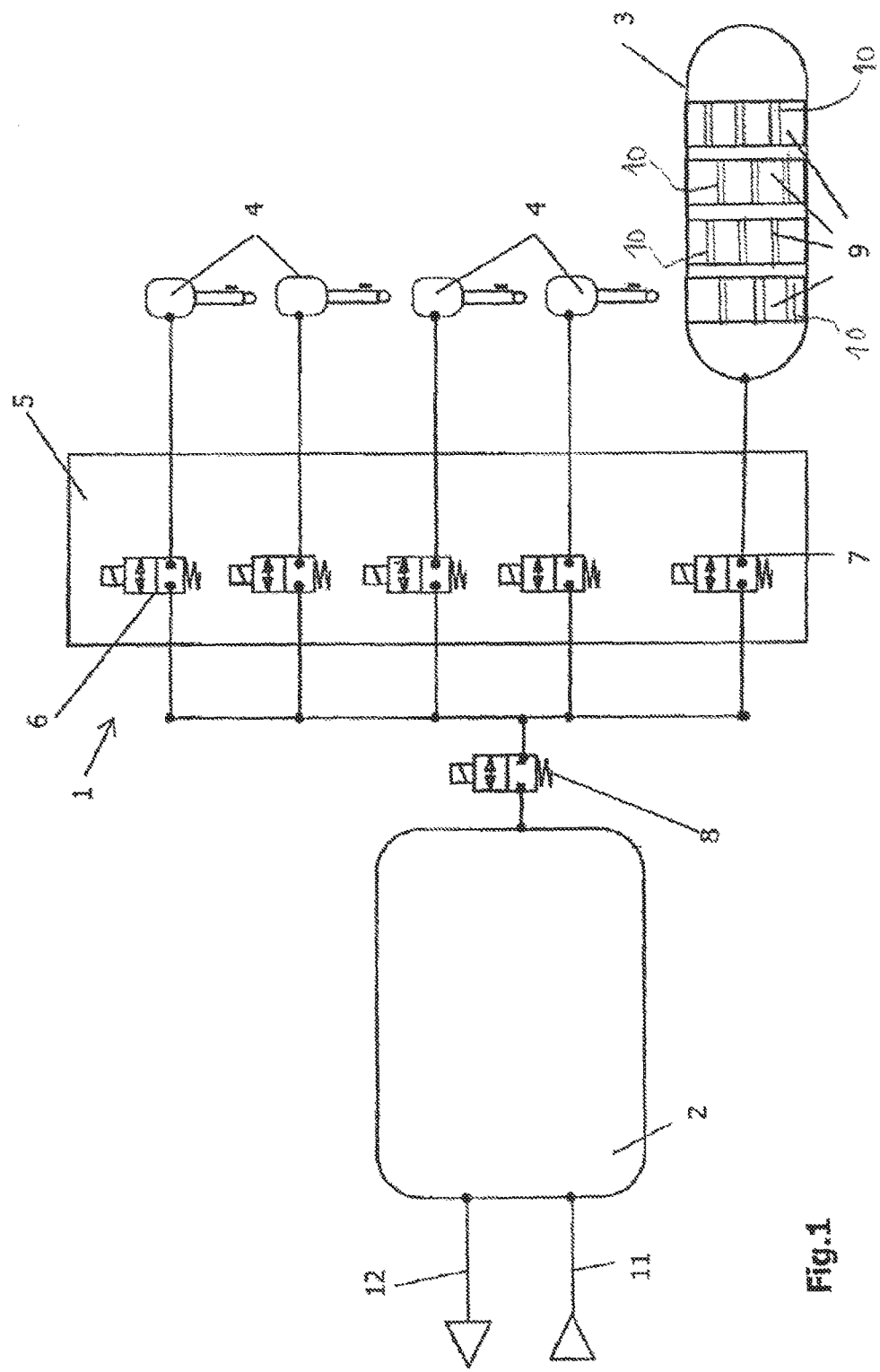
FIG. 1 shows an open air spring system for a vehicle.

An aspect of the invention is to provide an air spring system that avoids the disadvantages arising in the hitherto known air spring systems and that results in a simplified air spring system that results in smaller constructional dimensions of the individual components, while the spring stiffness is improved or maintained.

According to an aspect of the invention, an improvement of the suspension and damping behavior of the air spring system is achieved by adsorptive material being introduced into the compressed air spaces of the air springs and/or of the compressed air storage device. The air volume in the compressed air spaces can be increased several times by means of the adsorptive material. The uptake of the absorbed gas molecules increases as the pressure increases. The knowledge derived from this fact is that an improved, particularly softer, suspension or damping can be achieved by introducing adsorptive material into the compressed air spaces. However, it is also possible to reduce a reduction of the external dimensions of the air springs or of the compressed air storage device volume without altering its suspension or damping properties by inserting adsorptive material into the compressed air spaces. A better spring rate is thus achieved in the case of air springs, and a smaller constructional volume in the case of compressed air storage devices.

The adsorptive material can be used both in air spring systems with an open system and with a closed system. In an open system, the compressor unit is directly connected to the external air, while in a closed system, the compressed air remains within the compressor unit of the pressure storage device. In both cases, the compressed air storage device with or without the compressor unit can be connected to the air spring of the vehicle in order to alter the height level of the vehicle. In many cases, it is advantageous if the compressed air storage device is the first to be connected to the air springs, because the pressure in the air springs is thus increased more rapidly than if the compressor unit is the first to be connected, because that exhibits a certain delay when put into operation.

The introduction of adsorptive material into compressed air spaces of air springs is known per se from WO 2012/052776 A1. Activated carbon in the form of granules is used as the adsorptive material. It was found that the granules result in a good absorption of the gas molecules; but it is difficult to position the granules. Even when it is kept in its position, for example by means of grates. During operation, the movement of the granules results in unpleasant noise and also in mechanically abraded material in the form of dust that can lead to a failure of valves and other parts of the air spring system, such as, for example, the dryer or the compressor unit.

In order to avoid the above-mentioned drawbacks, the adsorptive material is used, according to the invention, in the form of porous geometrical elements that are inserted into the pressure storage device and/or the air springs. A grained adsorptive material is used for producing the geometrical elements, which is transformed in a suitable manner into the desired geometrical form. The geometrical form can be, for example, a cylinder that can be inserted into the compressed air storage device or the air spring. In or to maintain a good access of air to the adsorptive material, the element can be provided with compressed air ducts. These compressed air ducts can consist, for example, of fiber bundles inlaid into the element. The free spaces between the individual fibers of the fiber bundle permit a good compressed air supply to the adsorptive material. The elements can be fastened in the air springs or in the compressed air storage device in a positive manner, frictional manner or by substance-to-substance connection.

The monolith-like elements are preferably produced by agglomeration of the grained starting material. In this case, it is advantageous if the agglomeration takes place by means of a sintering process with the application of pressure and an increased temperature. Optionally, a resin as a binding agent can be added to the agglomeration. The resin is selected in such a way that it promotes the bonding of the grained parts of the adsorptive material without covering the surfaces of the grains in order not to interrupt the access of the compressed air to the adsorptive material.

Preferably, the elements are produced separated from the site of use. The finished parts are then inserted into the compressed air storage device or into the air springs. However, it is also possible that the agglomeration of the element (s) takes place right at the site of use. This can take place, for example, by applying a coating onto the inner surfaces of the compressed air components. Among other things, the coating can also be applied to the inner wall of the rolling bellows. In this case, it is advantageous if the elements produced by coating are covered by an air-permeable layer. This covering layer can also be formed by coating on-site. An air-permeable elastomer can be used for this purpose.

Another option for producing the geometrical element is that the adsorptive material is embedded in a gas-permeable foam material structure. In the process, the grained adsorptive material is introduced into the foamed material prior to the latter being foamed. A foamable elastomer can also be used when fastening the element by coating.

Depending on the shape of the space into which the elements are to be inserted, one or even more elements can be inserted side-by-side or also at different locations.

The inner space of the rolling piston or of the pot is an advantageous location for accommodating the element or elements in the case of an air spring. In the case of air springs provided with additional containers, the elements can also be inserted into the additional containers. In this case, the additional containers can be firmly or replaceably connected to the air spring. The outer shape of the elements is generally adapted to the shape of the site of use.

In general, it is noted that, if necessary, the air spring itself can be configured in a simpler manner and that the storage volume of the additional container can also be reduced if the elements are accommodated in an additional container. This also applies if a pressure storage device is used in the compressed air system of the air springs.

If the elements are fastened on the rolling bellows, it may be advantageous if the elements are formed by the inner lining of the rolling bellows itself. For this purpose, the inner lining must be configured accordingly by having on its inner side an air-impermeable wall.

Generally, the use of a grained adsorptive material is provided. In many cases, it is advantageous if a fine-grained structure is provided because it has a greater absorption capacity for gas molecules at a smaller constructional volume. The preferred starting material is an activated carbon, which permits advantageous processing.

Referring to several exemplary embodiments shown in the drawing, the invention is explained below.

The air spring system 1 shown in FIG. 1 consists of the compressor unit 2 as a compressed air supply device, the compressed air storage device 3, the air springs 4 and the valve block 5. The valve block 5 contains the valves 6 for the individual air springs 4 and the valve 7 towards the compressed air storage device 3. Further, there is also the valve 8 that serves for switching the compressor unit 2 in or off. The compressor unit 2 is connected to the environment via the lines 11 and 12. Several cylindrical elements 9 of or with adsorptive material are inserted into the compressed air storage device 3. The elements 9 are configured cylindrically and have a plurality of ducts 10 for compressed air. The air springs 4 can also be provided with adsorptive elements in a corresponding manner. The absorption capacity of the elements 9, and thus the configuration of the components 3 and 4, is dependent upon the type of the elements 9, their size and their number. The bigger the absorption capacity of the elements 9, the smaller the components 3 and 4 can be.

FIG. 1 also shows the accommodation of individual activated carbon elements 9 in the compressed air storage device 3. These compressed air storage devices 3 are used if a storage of the compressed air is advantageous. The individual air springs 4 and the pressure storage device 10 are filled with compressed air via the compressor unit 2. The respective flow paths of the compressed air are controlled via the valves 6. If necessary, the air springs 4 can also be equipped with activated carbon elements 9.

Figure 2:
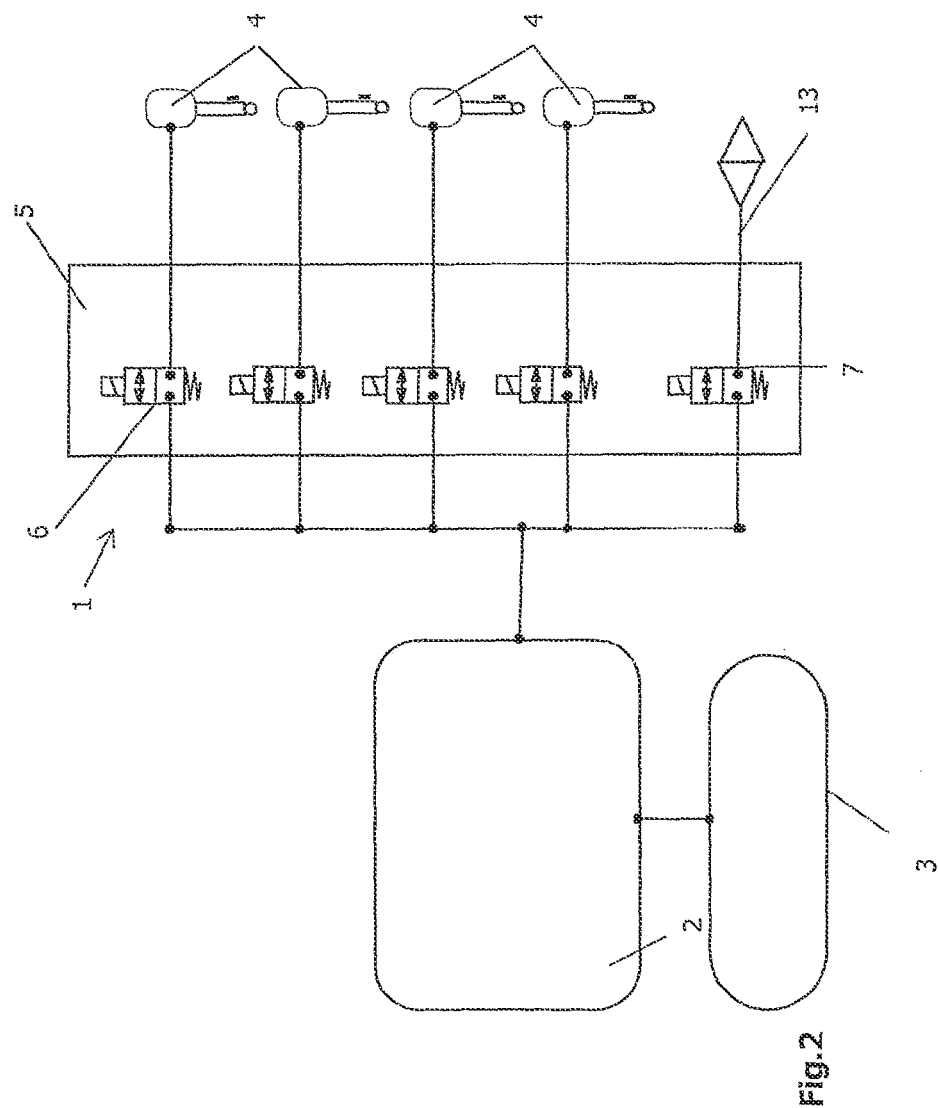
FIG. 2 shows a closed air spring system.

The closed air spring system 1 shown in FIG. 2 has a structure that is comparable to FIG. 1, with the difference that the compressed air storage device 3 is directly connected to the compressor unit 2 and the compressed air is moved in a closed system. The line 13 constitutes the filling connection that also serves as an air regenerating device. The valve control for the compressed air storage device 3 is located in the housing of the compressor unit 2.

Figure 3:
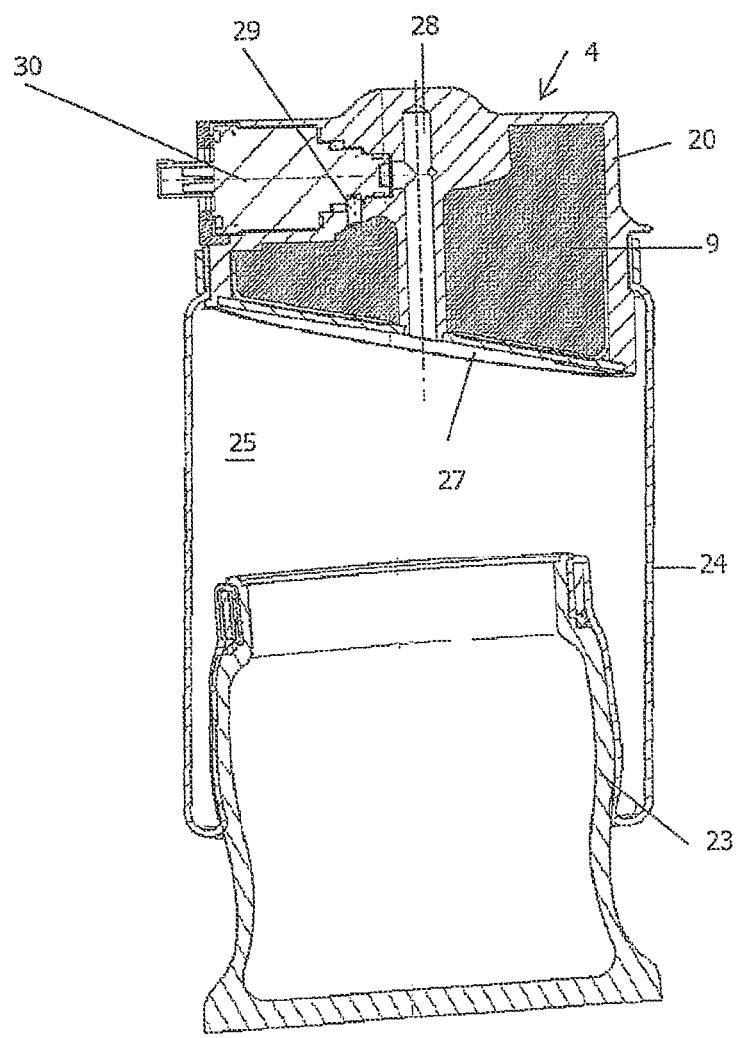
FIG. 3 shows a longitudinal section through an air spring with an activated carbon element in the air spring pot.

FIG. 3 shows an air spring 4 that substantially consists of the air spring pot 20, the rolling piston 23 and the rolling bellows 24. The above-mentioned parts enclose the compressed gas volume 25 of the air spring 4. The element 9 of adsorptive material, which consists of activated carbon and which is geometrically configured to fill the free space available in the air spring pot 20, is accommodated in the air spring pot 20. In the chosen example, the pot 20 is covered on its side facing towards the compressed gas volume 25 by the washer 27. The volume 25 is connected to the element 9 via the duct 28 and the bore 29. The flow can be controlled through the valve 30. This embodiment makes it possible to arbitrarily add the space filled with the adsorptive material to the total volume 25. Thus, the absorption capacity in the volume 25 can be altered, and the spring stiffness as well as the insulating effect or damping of the air springs 4 can be controlled. The molecules from the gases from the volume 25 can be bound by the activated carbon due to purely physical forces, which results in a higher gas absorption, whereby the spring stiffness of the air spring 4 is reduced. It is possible, with the same spring stiffness, to reduce the basic volume of the air spring 4 and thus use less complex or smaller components.

Figure 4:
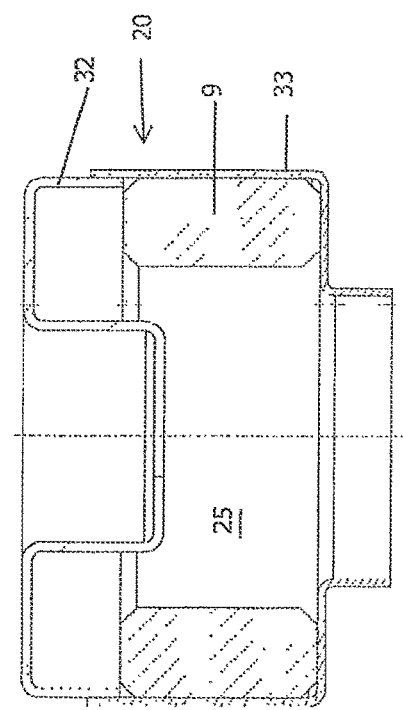
FIG. 4 shows a section through an air spring pot with an annular activated carbon element.
Figure 5:
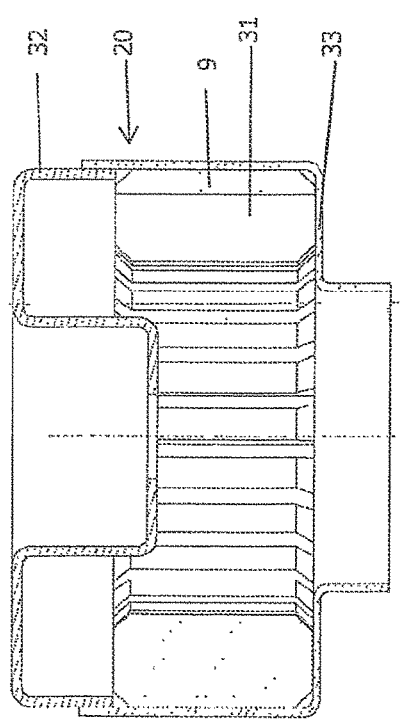
FIG. 5 shows the air spring pot according to FIG. 4 with an annular carbon element with inwardly directed individual ribs.

FIGS. 4 and 5 show simplified embodiments of an air spring pot 20, into which an annular activated carbon element 9 is inserted in FIG. 4, while a comparable element 9 with inwardly directed ribs 31 is used in FIG. 5. The rib-shaped configuration results in a more rapid access of the compressed air to the activated carbon. The air spring pot 20 provided here consists of the top part 32 and the bottom part 33, which are interconnected. The connection can be configured to be detachable or non-detachable. The activated carbon element 9 is inserted into the part 33 of the air spring pot 20.

Figure 6:
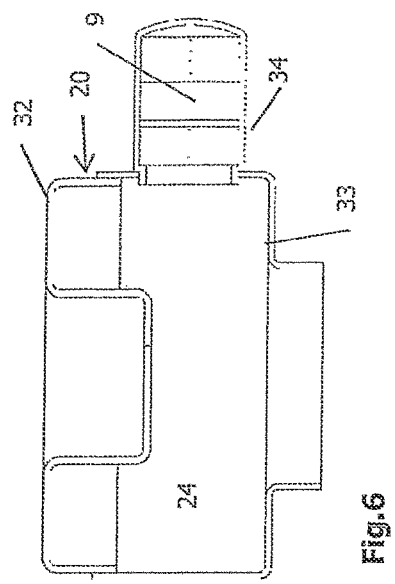
FIG. 6 shows the air spring pot with a laterally attached additional volume with several carbon elements.

FIG. 6 shows the air spring pot 20 with a laterally attached additional container 34, into which several individual elements 9 are inserted. The additional container 34 can be configured as a replaceable cartridge. The cartridge is fastened to the air spring pot 20 in a suitable manner. The absorption capacity of the cartridge can be altered by the variable number of the activated carbon elements 9.

The longitudinal section of FIG. 7 shows an embodiment in which the activated carbon element 9 is inserted into the inner space 35 of a separate container 36. The container 36 is connected to the air spring pot 20 and protrudes up into the inner space 35 of the rolling piston 23.

FIG. 8 shows an embodiment of the rolling piston 23 consisting of plastic. In this case, the rolling piston 23 is configured to be double-walled, with the walls 37 and 38 having the same wall thickness. The use of plastic makes as light an embodiment of the rolling piston 23 possible. The inner space 35 of the rolling piston 23 is filled approximately halfway with the activated carbon element 9. Bores 42, for example, can be introduced into the element 9 in order to enable a more rapid gas exchange between the carbon-free inner space 35 and the carbon-filled three-dimensional volume 43 of the air spring 4. In this case, the element 9 has the shape of a cylinder.

The use of the invention in an air spring damper (suspension strut) is shown in FIG. 9. In the embodiment shown, the basic configuration of the air spring damper consisting of an air spring 4 and a damper 45 is retained. In contrast, the rolling piston 23 is equipped with an increased interior volume 44, which accommodates the carbon element 9. The hollow cylindrical inner space of the rolling piston 23 is connected to the inner space 25 above the rolling piston 23 via openings 46. Thus, a considerably larger absorption capacity of the amount of compressed gas is obtained, so that the dimensions of the air spring damper can also be reduced.

FIGS. 10 and 11 show two options in which a coating 51 with activated carbon constituents is applied to the inner surface 50 of the rolling bellows 24. In a simplified illustration, FIG. 10 shows the cover layer 52, the thread ply of the reinforcing material 53 and the inner lining 54 inside. In FIG. 11, the rolling bellows 24 is provided with the intermediate layer 55 onto which an activated carbon element 9 is applied, which is covered by an air-permeable porous layer 56.

Another option for the configuration of the activated carbon elements 9 is that the elements 9 are formed from a gas-permeable foam material structure into which individual activated carbon particles are embedded.

Figure 12:
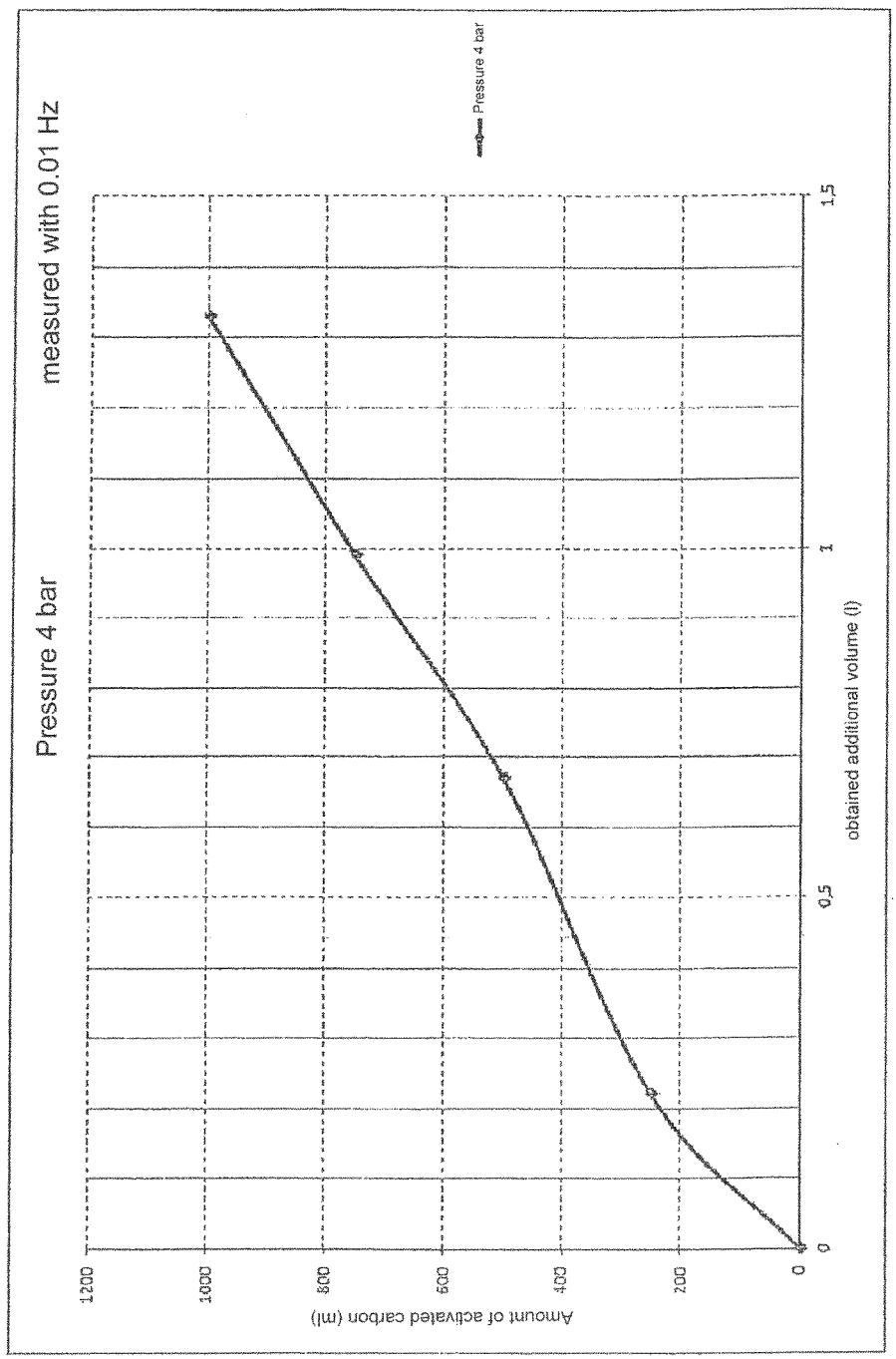
FIG. 12 shows a diagram with information on the static absorption capacity of an element of activated carbon.

In a diagram, FIG. 12 shows the statically possible additional volume of compressed air in a 2-liter container after the insertion of activated carbon elements. The obtainable additional volume of compressed air in liters (l) in relation to the amount of activated carbon in milliliters (ml) can be read out on the abscissa. For example, if an element with a volume of 400 ml is added, an additional volume of compressed air in the container of 0.5 l can be obtained, given a pressure in the container of 4 bars.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An air spring system comprising:
at least one air spring with at least one compressed air chamber, the compressed air chamber comprising a first chamber with a variable volume defined at least in part by a rolling bellows and a second chamber in fluid communication with the first chamber, the at least one air spring being connected to a compressor unit as a compressed air supply device, wherein a compressed air space of the second chamber is provided with an adsorptive material, wherein the adsorptive material is an agglomerated porous monolithic element defining a geometrical shape that fills the second chamber.

2. The air spring system according to claim 1, wherein the agglomerated porous monolithic element is provided with compressed air ducts.

3. The air spring system according to claim 2, wherein the compressed air ducts are comprised of fiber bundles inlaid into the agglomerated porous monolithic element.

4. The air spring system according to claim 1, wherein agglomeration is achieved via a sintering process with the application of pressure and an increased temperature.

5. The air spring system according to claim 1, wherein the agglomerated porous monolithic element is comprised of a coating.

6. The air spring system according to claim 1, wherein the agglomerated porous monolithic element is covered by an air-permeable layer.

7. The air spring system according to claim 6, wherein the air-permeable layer is comprised of an air-permeable elastomer.

8. The air spring system according to claim 1, wherein the second chamber is a pot of the air spring.

9. The air spring system according to claim 1, wherein at least one said agglomerated porous monolithic element is inserted into an additional container disposed on the at least one air spring.

10. The air spring system according to claim 1, wherein the agglomerated porous monolithic element has the shape of a cylinder.

11. The air spring system according to claim 1, wherein the agglomerated porous monolithic element is replaceable.

12. The air spring system according to claim 1, wherein the adsorptive material is an activated carbon.

13. An air spring system comprising:
at least one air spring with at least one compressed air chamber with a variable volume, the at least one air spring being connected to a compressor unit as a compressed air supply device and a compressed air storage device, wherein a compressed air space of the compressed air storage device is provided with an adsorptive material, wherein the adsorptive material is an agglomerated porous monolithic element that fills the compressed air space.

\* \* \* \* \*